Nov. 17, 1936.  D. S. STEVENS  2,061,390
GASEOUS CONDUCTION DEVICE
Filed April 8, 1933
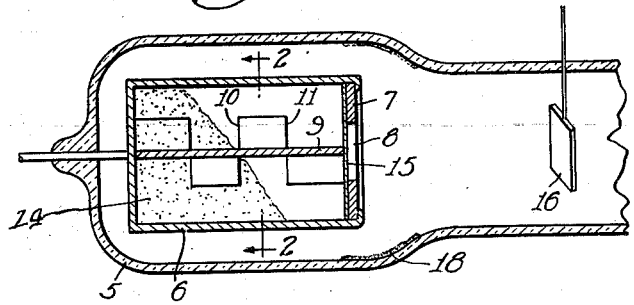
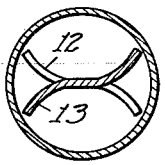
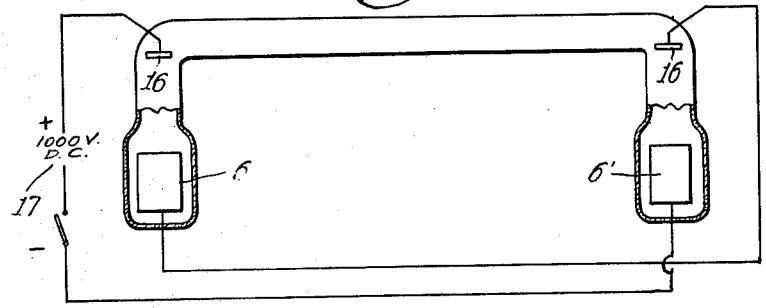
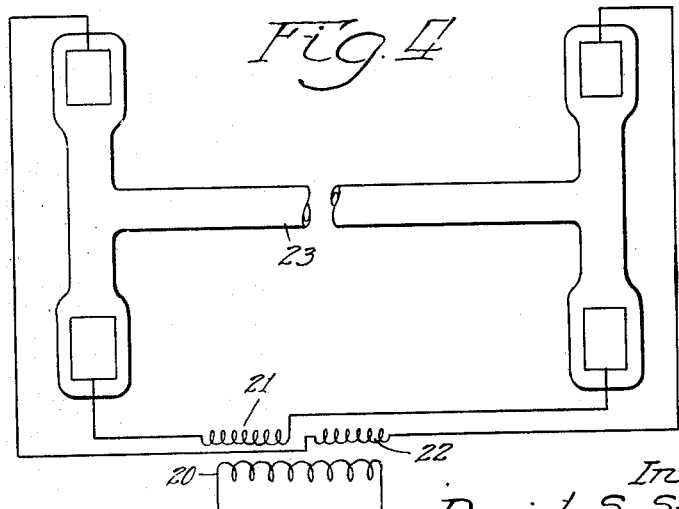
Inventor
Daniel S. Stevens
By:
Zabel Banning & Wells Attys.

Patented Nov. 17, 1936

2,061,390

UNITED STATES PATENT OFFICE 2,061,390

GASEOUS CONDUCTION DEVICE

Daniel S. Stevens, Chicago, Ill.

Application April 8, 1933, Serial No. 665,058

6 Claims. (Cl. 176—126)

My invention relates to gaseous conduction devices and has as its principal object the provision of a gaseous conduction tube in which large quantities of current may be caused to pass between two solid metallic electrodes over a long period of time without sufficient sputtering of the electrodes or clean-up of gas to interfere with the normal operation thereof.

My invention contemplates also the provision of a gaseous conduction tube in which a high intensity of current may produce a correspondingly high intensity of light with an efficiency substantially as good as is obtained in the present low amperage type of gaseous conduction tube.

My invention contemplates also the provision of a novel electrode for gaseous conduction devices and a novel method of processing the same.

Other and more specific objects will appear as the description proceeds in connection with the accompanying drawing. It is to be understood, however, that the drawing and description are illustrative only and are not to be taken as limiting the invention except in so far as it is limited by the claims.

In the drawing—

Fig. 1 is a section longitudinally through one end of the gaseous conduction device embodying my invention;

Fig. 2 is a section on the line 2—2 of Fig. 1 illustrating the electrode structure;

Fig. 3 is a diagrammatic view showing a tube in one stage of the processing; and Fig. 4 illustrates a modified form of tube with means for obtaining from a special transformer highly concentrated radiation in the tube.

Referring now in detail to the drawing, the gaseous conduction devices of which I speak usually have a tube or container 5 constructed of glass or other suitable material in which some gas which acts as the conductor between the electrodes in the tube is placed. Within the tube are provided electrodes 6 which may be constructed of any suitable material and are preferably made in the cup form. I find that for purposes of economy nickel is probably the best metal to use, although other metals such as tantalum, molybdenum, and iron may also be used. Iron, however, is not as good as some of the other metals.

These electrodes are comparatively large in size, for example, in a tube in which the current was between 300 and 500 ma. I used the following dimensions: Length 1⅛ inches, internal diameter ⅜ inch with a washer 7 over the front or open end, this washer to have a ¼ inch opening at 8 through which the discharge passes. The function of the washer 7 is primarily to hold the activating material 14 in the electrode. Within the electrode I provide a metallic plate 9 which may be of the same material as the electrode or of one of the other metals, and this plate is slotted along lines such as 10 and 11 with the portions between the slots being bent in opposite directions to form the supporting members, such as 12 and 13 (see Fig. 2). The purpose of providing the plate 9, in addition to getting larger exposed electrode surface, is to provide a baffle means for holding the activating material 14 in the electrode so that it will not readily tip out of the electrode. During the processing of the tube, at one stage I also utilize a sealing member 15 preferably of aluminum foil for completely closing the interior of the electrode. In the normal operation of the tube, however, this foil is removed from the opening 8. This foil is normally removed during the bombardment of the electrodes which causes it to be blown or melted out of the opening 8. An additional electrode 16 is provided within the tube for use in the processing thereof.

Referring now to the manner in which the tube is prepared and processed, the electrode is activated in the following fashion:

The tube is first connected to a pump and evacuated, the electrode having in it a substantial amount of some oxygen bearing compound or salt of an alkali metal preferably one in which the acid radical forms a stable compound. The substance also should be stable at atmospheric temperature, and I find that an alkaline chromate, such for example as potassium chromate which is a yellow substance stable in air to a substantial degree, is very useful for my purpose. With the activator 14 within the electrode and the tube evacuated to a substantial degree, I heat up the electrode by means of an induction heater so as to melt the activator. At this time the aluminum foil shield 15 must be used because of the tendency of the activator to explode and blow out into the tube as it heats up. The activator melts at about red heat to a thick fluid, in the case of potassium chromate, and most of this material undergoes a change so that a green residue is formed and a coating is formed on the electrode, the green material being an infusible oxide of the chromium, apparently $Cr_2O_3$. Then in order to pump the electrodes and complete the processing, I connect the tube up as shown in Fig. 3 so that a direct current source 17 is connected across the small electrodes 16 and their associated large electrodes such as 6—6'.

The tubes are then heated by passing one to two amperes direct current through them which heats the electrodes to a substantially white heat. This sometimes causes a deposit at 18 of potassium upon the glass, and this may act as a getter to clean up the active gases within the tube. Apparently what is accomplished within the electrodes 6 is a break down of the alkaline chromate to produce a stable compound of the acid radical and a potassium oxide, and this oxide in turn reacts with the metal of the electrode to form an oxide such as nickel oxide where the electrode is nickel and liberates pure potassium. This potassium forms a high emission surface within the electrode.

The exact theory of this transformation, however, I do not at the present time fully understand. I do find that a tube prepared in this fashion is capable of passing a much higher current than is obtained in the ordinary gaseous conduction tube with the same lighting efficiency; in fact, the amperage which may be passed is more than five times that of an electrode not processed. The high currents do not apparently shorten the tube life and the tubes may be operated for a normal useful life of several thousand hours. The increased current I find increases the intensity of light within the tube in accordance with the increased current and also warms the tube up, but in using a 16 mm. tube for a current 300 ma. the tube does not get hot enough but what it can be held in the hand.

In Fig. 4 I have shown a modified form of the device wherein the single primary 20 of a transformer is provided with two secondaries 21 and 22 to feed a four electrode tube 23. Within the single portion of the tube 23 I can obtain a very high intensity of current and therefore of light radiation which is particularly useful for some purposes.

The inner plate 9 appears to be hotter than the electrode shell during normal operation of the tube. It sometimes appears to be red hot within the shell.

I find that with a tube having electrodes of this kind I can even operate the tube with a filling of some of the more active gases such as oxygen or hydrogen. The electrodes do not appear to splutter so rapidly as untreated electrodes do in such gases. I have operated a tube with oxygen filling for many hours with little apparent destructive action.

From the above description, it is believed that the nature of my invention will be clear to those skilled in the art and the advantages thereof readily apparent.

Having thus described my invention, what I claim as new and desire to secure by Letters Patent is:

1. An electrode for gaseous conduction tubes capable of passing currents in excess of one-half ampere during a normal useful life, said electrode comprising a metal cup having therein an activating substance consisting of potassium chromate.

2. The method of processing an electrode for gaseous conduction tubes which comprises melting a quantity of potassium chromate on the electrode sufficiently to form a stable infusible compound including the acid radical of said salt, and thereafter bombarding the electrode in a vacuum.

3. In a gaseous conduction device, an electrode comprising a cup-like body having its end closed with a thin metal foil.

4. In a gaseous conduction device, an electrode comprising a cup-like body having its end closed with a thin sheet of material which may be readily removed by bombardment of the electrode.

5. The method of processing an electrode for gaseous conduction tubes which comprises placing a quantity of activating material in a cup electrode, closing the open end of the electrode with a thin metal foil and bombarding the electrode in a vacuum.

6. The method of processing a positive column gaseous conduction tube and electrodes therefor which comprises inserting in a recess in a metal electrode a quantity of an oxygen bearing salt of an alkali metal of which the acid radical forms a stable compound, sealing the salt within the recess, and melting the salt to substantially break down the salt into the stable acid radical and the metal oxide, thereafter sealing the electrodes in a tube and evacuating the tube and passing current through the tube sufficient to heat the electrodes sufficiently to decompose the alkaline metal oxide and liberate the alkaline metal.

DANIEL S. STEVENS.